(12) United States Patent
Buttet

(10) Patent No.: US 7,158,757 B2
(45) Date of Patent: Jan. 2, 2007

(54) MODULAR COMPUTER

(75) Inventor: Jean-Pierre Buttet, Martigny (CH)

(73) Assignee: Smartdata S.A., Martigny (CH)

( * ) Notice: Subject to any disclaimer, the term of this patent is extended or adjusted under 35 U.S.C. 154(b) by 198 days.

(21) Appl. No.: 10/477,931

(22) PCT Filed: May 29, 2001

(86) PCT No.: PCT/CH01/00334

§ 371 (c)(1),
(2), (4) Date: Nov. 18, 2003

(87) PCT Pub. No.: WO02/097596

PCT Pub. Date: Dec. 5, 2002

(65) Prior Publication Data

US 2004/0142724 A1    Jul. 22, 2004

(51) Int. Cl.
*H04B 5/00* (2006.01)
(52) U.S. Cl. .................. 455/41.3; 455/66.1; 725/62
(58) Field of Classification Search ............... 455/41.2, 455/41.3, 66.1, 557, 550.1; 725/62, 74, 81
See application file for complete search history.

(56) References Cited

U.S. PATENT DOCUMENTS

| 6,229,700 B1 | 5/2001 | Liu et al. |
| 2002/0002707 A1* | 1/2002 | Ekel et al. ................ 725/87 |
| 2002/0059642 A1* | 5/2002 | Russ et al. ............... 725/135 |
| 2003/0050058 A1* | 3/2003 | Walsh et al. ............. 455/426 |

FOREIGN PATENT DOCUMENTS

| DE | 196 39 700   | 4/1998 |
| EP | 0 710 017 A2 | 5/1996 |
| EP | 1 059 809 A2 | 12/2000 |
| GB | 2 299 878    | 10/1996 |
| WO | WO 00/00880  | 1/2000 |

* cited by examiner

*Primary Examiner*—Nguyen T. Vo
(74) *Attorney, Agent, or Firm*—Nixon & Vanderhye P.C.

(57) ABSTRACT

The invention concerns a computer comprising a central unit, an input device, a communication interface with a remote network and display and/or sound reproduction means. The invention is essentially characterised in that the computer can consist of elements already existing in the user's surroundings (for example, portable telephone, television).

17 Claims, 2 Drawing Sheets

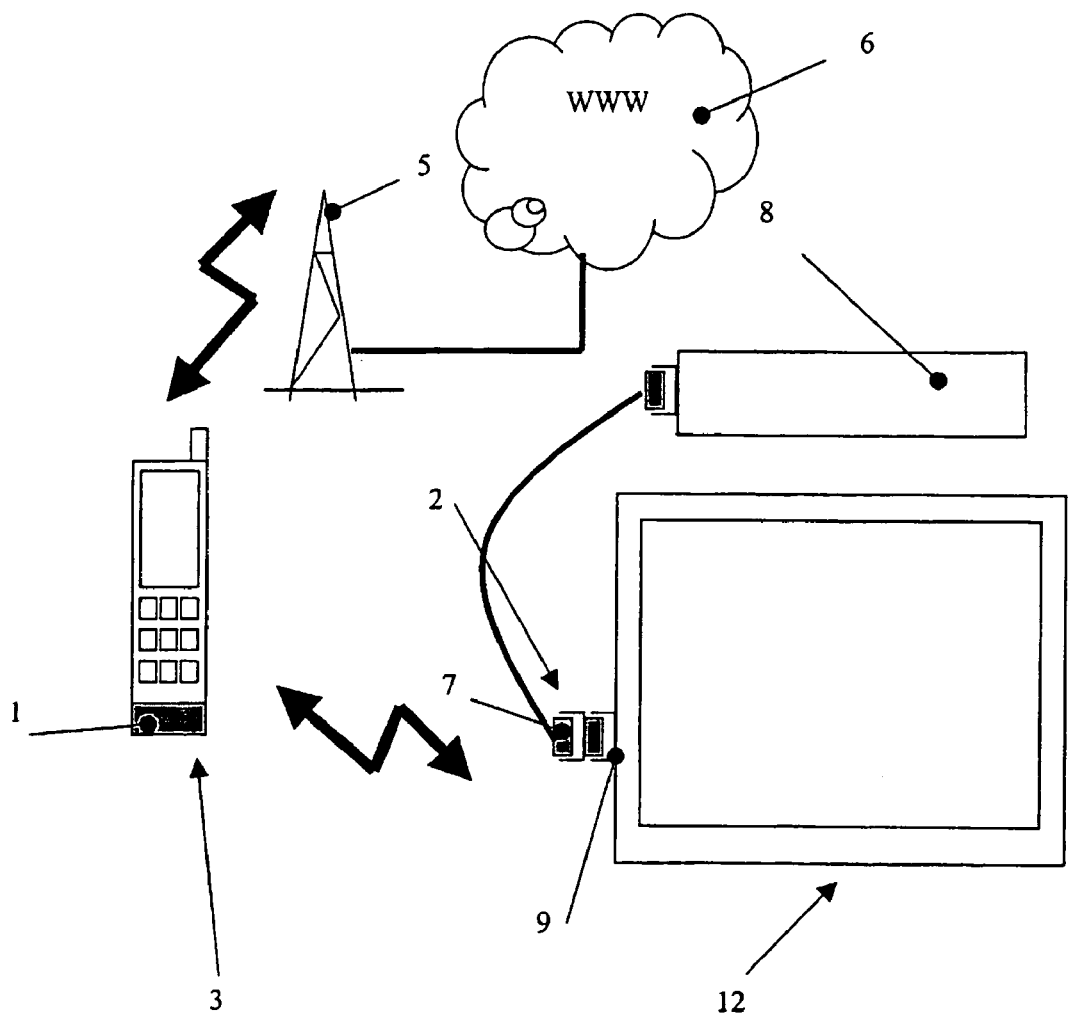
Fig. No. 1

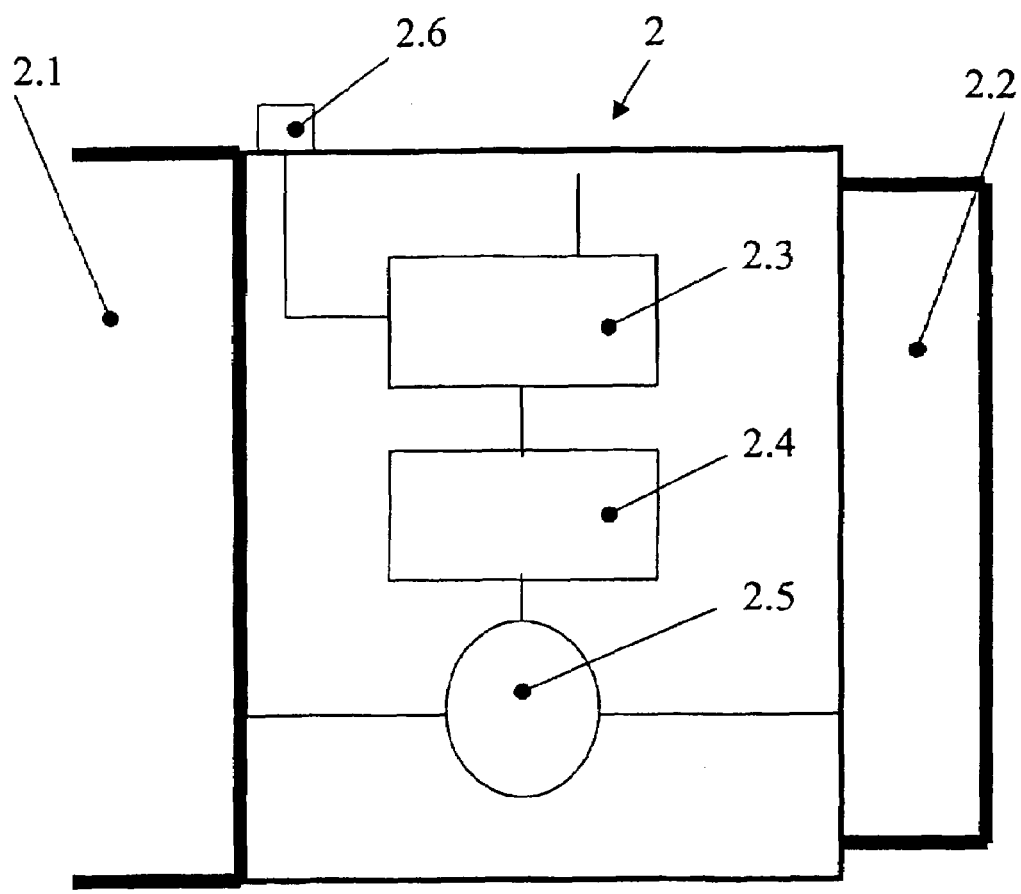
Fig. No. 2

MODULAR COMPUTER

This application is the U.S. national phase of international application PCT/CH01/00334 filed 29 May 2001 which designated the U.S.

The present invention pertains to the field of computers.

In its most frequent structure, a computer comprises several elements, in particular a central unit (microprocessor, hard disk, RAM memory, etc.), an input device (e.g. a keyboard), display means, sound reproduction means and an interface for communication with a remote network (e.g. Internet).

This plurality of elements renders the cost of a computer relatively high, usage often rather inconvenient and/or transport thereof awkward.

The present invention is aimed in particular at remedying the aforesaid problems.

The purpose thereof is to allow the production of a portable microcomputer that is capable of using existing installations as means of communication with remote users or networks.

It is found that at present mobile telephones, pocket computers (of the electronic organizer type), televisions, computer screens, video projectors are very widespread.

The invention therefore aims to profit from the presence of these elements, it relates to a computer comprising a central unit, an input device (e.g. a keyboard and/or a mouse, a touch screen or any other pointing or input device), an interface for communication with a remote network and display and/or sound reproduction means, the computer is characterized in that it comprises the following three separate elements:

a) a first element comprising said central unit which contains means for storing and executing computer programs and means for storing data, b) a second element comprising said data input device, said interface for communication (with or without wires) with a remote network and means of wireless transmission (e.g. by radio or by infared) with said first element, c) a third element comprising said display means and/or said sound reproduction means and means of connection to said first element, said first element is of reduced size (pocket format) and furthermore comprises means of connection to said third element and means of receiving, respectively sending, signals sent, respectively received, by said second element.

The second element can serve simultaneously as:

communication gateway between the remote network and said first element, means for the user of said second element, to dispatch commands which are received and interpreted by said first element.

The microcomputer according to the invention can for example use the screen of a television as display device, the acoustic cabinets associated with the television as sound reproduction element, the keypad or the touch screen of a mobile telephone as user interface; the radio communication interface being obtained through this same mobile telephone which also operates as gateway for accessing a remote communication network.

Furthermore, the result obtained with the computer according to the invention can result in a higher-performance assembly than the computers of the state of the art. Specifically, this microcomputer is for example capable of reproducing sound on the high-fidelity acoustic cabinets of a television to which it is hooked up, or of offering a giant picture using a video projector.

A few nonlimiting exemplary embodiments of the invention are described hereinbelow by means of the following figures:

FIG. 1 illustrates an embodiment of the computer according to the invention.

FIG. 2 describes an embodiment of the first element.

The device represented in FIG. 1 consists of a first element 2 which comprises a central unit, a mobile telephone 3 and a conventional television set 12.

A wireless communication interface 1, for example of Bluetooth 802.11b type or the like, is connected or built into the mobile telephone 3.

The mobile telephone 3 is capable of effecting a link with a remote telecommunication network 6 (for example Internet) by performing a wireless data transmission with a fixed antenna 5 connected to the remote network 6, using its standard communication interface, for example GSM, GPRS, UMTS or the like.

The first element 2 can access data situated on the remote network 6 via the interface 1 of the mobile telephone 3. In this case, the mobile telephone 3 operates as communication gateway between the remote network 6 and the first element 2.

The first element 2 is of small size, so that it can be connected in a fixed or removable manner to a signal input of the television set 12. In the example illustrated in FIG. 1, the first element 2 is fixed to a SCART socket 9 of the television 12. The first element can thus dispatch audio and video signals to this same television 12.

If necessary, another cable 7, coming from a video source, for example a video recorder 8, can be connected to the first element 2. In this case, the first element 2 provides for the conveying of the signals between the video recorder 8 and the monitor 12, allowing conventional operation of the system.

A wireless communication interface included in the first element 2 makes it possible to exchange data with the corresponding interface 1 of the mobile telephone 3.

A computer program contained in the mobile telephone 3 enables the user to use his mobile telephone 3 to input and dispatch the necessary commands to the first element 2. The mobile telephone 3 contains a menu of commands for dispatch to the first element 2 (the menu can for example be displayed on the display screen of the mobile telephone 3). In this way, a user can select and execute the desired command using the keypad of the mobile telephone 3.

A command enables the user of the mobile telephone 3 to transform his telephone into a gateway, thus allowing the first element 2 to connect up to a remote network, for example the Internet network 6 through the fixed infrastructure 5 of the mobile telephone network, through the mobile telephone 3 and through its other wireless communication interface 1.

In this manner, the first element 2 can be connected for example to the Internet 6.

The first element 2 is illustrated in greater detail in FIG. 2. It is composed of a small box, advantageously of pocket format, to which is fixed the system for electrical connection to the external television, video projector or computer monitor.

For example, in the case of connection to a television, a female SCART connector 2.1 is fixed to the left part, and a male SCART connector 2.2 to the right part.

The audio and video electrical signals can pass through the first element 2 by traversing the connector 2.1, and by passing without alteration through the electronic device 2.5, to go to the connector 2.2. Thus, as shown by FIG. 1, the first element 2 can be connected to the television by plugging the connector 2.2 into the SCART socket 9 of the television.

Likewise, the optional cable arriving normally at the television 12 (for example, a cable 7 coming from a video recorder 8 or any other signal source), can be connected to the television 12 by way of the connector 2.1 fixed to the first element 2.

The first element 2, can for example be easily transported in a pocket from one place to another, and it can be connected, even for temporary use, directly to the connector of any television having this type of connection. This type of connection being standardized, the first element 2 can be mounted on a large number of standard televisions.

The first element 2 contains a communication interface 2.3 able to establish a wireless data transmission between an external appliance, for example the mobile telephone 3, and the microprocessor-based electronic system 2.4 contained in the first element 2.

The microprocessor-based system 2.4 is capable, by virtue of a computer program that it executes, among other things, of the following actions:

Interpreting the commands coming from the telephone 3; these commands being generated by the user who actuates the mobile telephone 3.

Interpreting the data that he has searched for on a remote network 6.

In this way, for example, commands generated by the user of the mobile telephone 3 will start inside the system 2.4 the execution of a program of the Internet browser type.

This browser can for example fetch data from a remote network (via the mobile telephone 3). These data are interpreted by the Internet browser program and the resulting Internet pages are also transformed by 2.4 into the form of corresponding audio and video signals that are dispatched so as to be displayed thereon and returned to the television 12.

The television 12 can also have built-in acoustic cabinets for sound reproduction.

The optional device 2.5 can be controlled by the system 2.4, to establish bidirectional communication, either between 2.1 and 2.2, or 2.4 and 2.2 (controlled routing).

The first element 2 can comprise one or more switches 2.6 enabling the user to engage, disengage or reset the first element 2. The first element 2 can be powered by an external power supply, or can be powered through the intermediary of the connectors 2.1 and/or 2.2, by virtue of the appliances connected thereto.

The SCART connectors mentioned in this document are so by way of illustration of a possible variant, they may be substituted by any other type of Audio/Video connector either analog or digital so as to connect the first element 2 to the sound and picture reproduction element 4.

In another variant execution, the video part is not processed by the first element 2, only the sound part is processed. The first element 2 can then be connected to the sound reproduction element 4 (television, only the sound part of which is used), or to another sound reproduction system, such as a hi-fi deck, radio which substitutes for the element 4.

In another variant of execution, the audio and video connections are replaced by another wireless communication interface so as to connect the first element 2 to the sound and picture reproduction element 4.

The mobile telephone 3 is mentioned by way of example, it may be substituted by any computer, pocket organizer, portable computer or office computer, and other electronic device capable of effecting the wireless links as described above.

In a variant of use, the two wireless interfaces of the mobile telephone 3 can be substituted by two radio channels on the same wireless interface.

In another variant of use, the two wireless interfaces of the mobile telephone 3 may be substituted by a wireless interface of radio type and an infrared interface.

In another variant of use, the two wireless interfaces of the mobile telephone 3 may be substituted by two infrared interfaces.

In a variant of use, several mobile telephones of types 3 may be used simultaneously by several users. In this case, one or more telephones may operate as a gateway to connect the first element 2 to the remote network, just as one or more telephones may dispatch command signals to the first element 2.

In another variant of execution, the audio and video connections 2.1 and/or 2.2 are replaced by another interface for wireless communication with the device 4.

Hereinbelow are a few nonlimiting examples of operation of the computer according to the invention.

Connection to the Internet

The user connects a first element 2 to a television, a computer screen, a video projector, spectacles allowing video image display or any other device making it possible to display video images and optionally to reproduce sound.

The user actuates a program contained in his mobile telephone 3. In a variant of use, this program is dispatched and made available by the first element 2 to the telephone 3, for example in the form of an applet.

This program, when it is executed, opens a communication channel between the remote network 6 and the microprocessor-based system 2.4 contained in the first element 2.

The signals then pass through the following path defined by the following point:

Remote network 6, fixed infrastructure 5, mobile telephone 3 (through its GSM or GPRS or UMTS wireless interface or the like), then through another wireless interface 1 of the telephone 3, to the wireless interface 2.3 of the first element 2 which dispatches the signals to the microprocessor-based device 2.4.

Through this means, the user can for example connect the system from the microprocessor 2.4 to the Internet 6.

In a noteworthy manner, and by virtue of his telephone 3, the user can simultaneously with the downloading of the data from the remote network to the device 2.4, dispatch commands to this same system 2.4. The commands are for example entered on the keyboard, the touch screen, the mouse or the voice recognition system of the appliance 3 and conveyed to 2.4 along the same path as the data coming from the remote network.

For example, a command can be dispatched to order 2.4 to consult a website corresponding to an address specified by the user. The system 2.4 establishes the connection, downloads the data therein, and interprets them so as to generate the video and/or sound signals representing the web page. These signals may be displayed on the television and the sound reproduced on its acoustic cabinets.

In a noteworthy manner, the user who already has a mobile telephone and a conventional television can consult the Internet, by virtue of the implementation of the first pocket element 2.

Game Platform

The user connects a first element 2 to a television, a computer screen, a video projector or any other device making it possible to display video images and optionally to reproduce sound.

The user actuates a program contained in his mobile telephone 3. In a variant of use, this program is dispatched and made available by the first element 2 to the telephone 3, for example in the form of an applet.

This program, when it is executed, opens a communication channel between the remote network 6 and the microprocessor-based system 2.4 contained in the first element 2.

The signals then pass through the following path defined by the following point:

Remote network 6, fixed infrastructure 5, mobile telephone 3 (through its GSM or GPRS or UMTS wireless interface or the like), then through another wireless interface 1 of the telephone 3, to the wireless interface 2.3 of the device which dispatches the signals to the microprocessor-based device 2.4.

Through this means, the user can for example connect the microprocessor-based system 2.4 to the Internet 6. The user can simultaneously dispatch commands to this same system 2.4, the commands are for example entered on the keyboard, the touch screen or the mouse of the appliance 3 and conveyed to 2.4 along the same path as the data coming from the remote network.

A command can be dispatched by the user, by virtue of his telephone 3 to order 2.4 to download a game from a website located on the Internet.

The system 2.4 located in the first element 2, establishes the connection, downloads the desired game and initiates execution thereof.

The pictures and optionally the associated sound are generated by the system 2.4 and displayed on the display device 4 to which it is connected. If sound signals are present, they are reproduced by the acoustic cabinets associated with the display 4 used, for example the acoustic cabinets of the television.

Simultaneously, the central unit 2.4 dispatches a small program (for example an applet) to the mobile telephone of each player present.

This program, when it is executed, enables each user to use his telephone as a joystick. Pressing certain keys of the telephone will trigger the dispatching of information through the wireless interface 1 of each telephone 3, to the unit 2.4. This unit interprets the respective signals as the game control commands on behalf of each player.

In this way, a player can download a game by virtue of his mobile telephone 3, have it executed by the unit 2.4 and share with several play the pleasure of playing.

The invention claimed is:

1. A computer comprising a central unit, an input device, an interface for communication with a remote network and display and/or sound reproduction means, characterized in that it comprises the following three separate elements:
   a) a portable pocket-sized first element comprising said central unit which contains means for storing and executing computer programs and means for storing data,
   b) a second physically separate element comprising said data input device, said interface for communication with a remote network and means of wireless transmission with said first element,
   c) a third physically separate element comprising said display means and/or said sound reproduction means and means of connection to said first element, and
   wherein said first element furthermore comprises means of connection to said third element and means of receiving, respectively sending, signals sent, respectively received, by said second element,
   wherein the first element can communicate with the remote network via the second element, and
   wherein the computer can use a screen of a television as the display means, an acoustic cabinet or cabinets associated with the television as the sound reproduction means, a key pad or a touch screen of a mobile telephone as the interface, and a radio communication interface obtained through the mobile telephone that also operates as a gateway for accessing the remote network.

2. The computer as claimed in claim 1, characterized in that the second element is a mobile telephone.

3. The computer as claimed in claim 1, characterized in that the second element is a pocket computer or pocket electronic diary.

4. The computer as claimed in claim 1, characterized in that the second element is a portable computer, office computer or server.

5. The computer as claimed in claim 1, characterized in that the third element is a conventional television screen.

6. The computer as claimed in claim 5, characterized in that the means of connection of the first element (2) consist of a SCART plug intended to connect up to the corresponding SCART socket of the third element.

7. The computer as claimed in claim 6, characterized in that the first element takes the form of an insert which furthermore contains a SCART socket.

8. The computer as claimed in claim 5, characterized in that the means of connection of the first element consist of connectors for audio and video signals and/or data, in analog or digital format, intended to connect up to the corresponding connectors of the third element.

9. The computer as claimed in claim 1, characterized in that the third element is a conventional computer screen or a video projector.

10. The computer as claimed in claim 9, characterized in that the means of connection of the first element consist of a VGA or SVGA socket, or other female video connector intended to connect up to the corresponding plug of the computer screen or of the video projector.

11. The computer as claimed in claim 10, characterized in that the first element takes the form of an insert which furthermore contains a VGA or SVGA plug, or other video or male connector.

12. The computer as claimed in claim 9, characterized in that the means of connection of the first element consist of connectors for audio video signals and/or data, analog or digital, intended to connect up to the corresponding connectors of the computer screen or of the video projector.

13. The computer as claimed in claim 1, wherein the third element is a sound reproduction means comprising a hi-fi deck, music amplifier with associated acoustic cabinets, car radio, radio, walkman, music recorder or any other sound reproduction, transmission and recording system, and a means of connection to said first element.

14. The computer as claimed in claim 13, characterized in that the means of connection of the first element consist of connectors for audio signals and/or data, analog or digital, intended to connect up to the corresponding connectors of the sound reproduction, transmission or recording system.

15. A method of communication used with the computer of claim 1, characterized in that it consists in simultaneously using said second element as:

a communication gateway between the remote network and said first element, a means for the user of said second element, to dispatch commands which are received and interpreted by said first element.

16. A portable, pocket-sized microcomputer device comprising a central unit that contains means for storing and executing computer programs and means for storing data, and which does not include a data input device and which does not include a display means or a sound reproduction means, wherein the central unit is capable of connecting with a physically separate element comprising a data input device that has an interface for communication with a remote network and a means of wireless transmission with the central unit, wherein the central unit is capable of connecting with another physically separate element comprising a display means and/or a sound reproduction means and that has a means of connection to the central unit, wherein the central unit comprises a means of receiving, respectively sending, signals sent, respectively received, by said physically separate element and a means of connection to said another physically separate element, wherein the central unit can communicate with the remote network via the physically separate element, and wherein the device can use a screen of a television as the display means, an acoustic cabinet or cabinets associated with the television as the sound reproduction means, a key pad or a touch screen of a mobile telephone as the interface, and a radio communication interface obtained through the mobile telephone that also operates as a gateway for accessing the remote network.

17. A computer comprising a central unit, an input device, an interface for communication with a remote network and display and/or sound reproduction means, characterized in that it comprises the following three separate elements:

a) a portable pocket-sized first element comprising said central unit which contains means for storing and executing computer programs and means for storing data, b) a second element comprising said data input device, said interface for communication with a remote network and means of wireless transmission with said first element, c) a third element comprising said display means and/or said sound reproduction means and means of connection to said first element, wherein said first element furthermore comprises means of connection to said third element and means of receiving, respectively sending, signals sent, respectively received, by said second element, wherein the second element is a pocket computer, pocket electronic diary, portable computer, office computer or serve, wherein the first element can communicate with the remote network via the second element, and wherein the computer can use a screen of a television as the display means, an acoustic cabinet or cabinets associated with the television as the sound reproduction means, a key pad or a touch screen of a mobile telephone as the interface, and a radio communication interface obtained through the mobile telephone that also operates as a gateway for accessing the remote network.

* * * * *